July 6, 1965  P. M. BOURDON  3,192,984
PNEUMATIC TIRE
Filed Jan. 15, 1958  3 Sheets-Sheet 1
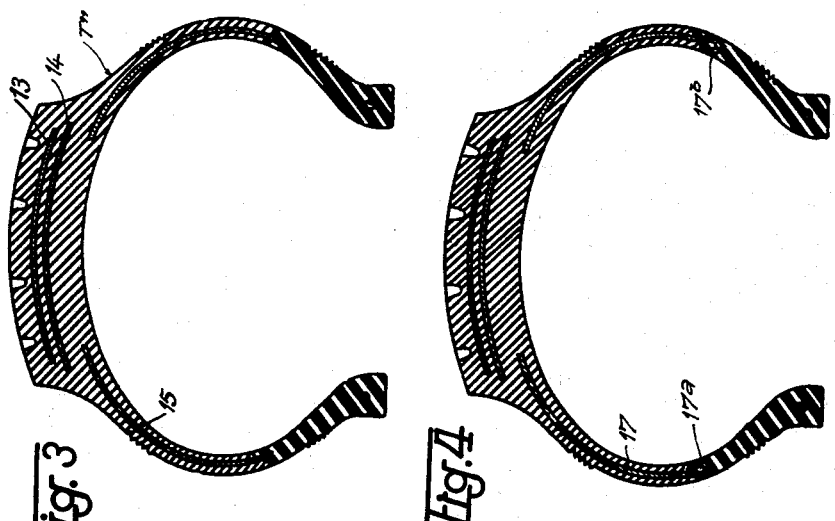
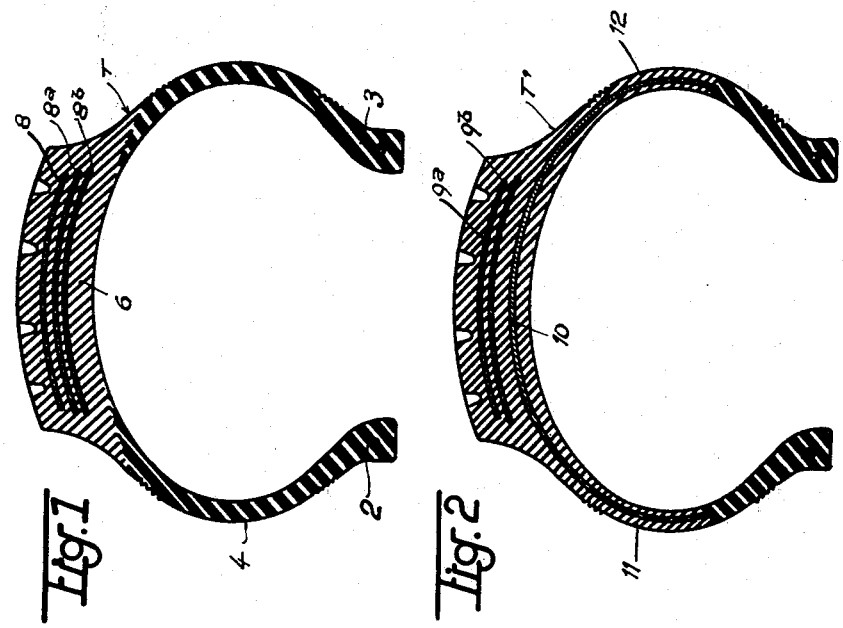
INVENTOR
PIERRE MARCEL BOURDON
BY
HIS ATTORNEYS

INVENTOR.
PIERRE MARCEL BOURDON

3,192,984
PNEUMATIC TIRE

Pierre Marcel Bourdon, Paris, France, assignor to "Michelin & Cie," Clermont-Ferrand, France
Filed Jan. 15, 1958, Ser. No. 709,132
16 Claims. (Cl. 152—354)

This invention relates to improvements in pneumatic tires and particularly to improvements in the casings of such tires.

This is a continuation-in-part of my U.S. application Serial No. 558,785, filed January 12, 1956, now abandoned.

The casing of the modern pneumatic tire includes a carcass which extends from bead to bead and forms the side walls and tread portion on which a tread band is received.

The carcass includes plies containing fabric formed of metal wires or cables or natural or synthetic textile threads which are usually anchored to the bead wires. The fabric comprises parallel cords, wires, cables, threads or the like, or a material woven from such threads, wires or cables. It is also usual for the casing to have a tread reinforcement formed of one or more plies of fabric between the carcass and the tread band and substantially coextensive with the latter.

In accordance with the present invention, a typical tire casing includes a tread reinforcement but the side walls are devoid of reinforcing carcass plies at least in the vicinity of the beads.

The absence of the carcass plies or the reduction in extent of the carcass plies leads, contrary to general belief, to important advantages. One advantage resides in greater riding comfort for the passengers of a vehicle fitted with tire casings embodying the invention. When a vehicle is moving on the road, shocks due to irregularities in the road surface are transmitted to the vehicle through the side walls of the casings and the wheels. In the conventional casing, the metallic or textile elements of the carcass plies provide continuous paths from the vicinity of the tread to the bead wires along which paths the shock waves travel rapidly without substantial damping. By the elimination or interruption of the paths provided by the carcass plies, the speed of the shock waves is greatly reduced and the waves are strongly damped by and dispersed in the material of the side walls which may be rubber (natural or synthetic) or a plastic. Such shocks as reach the beads and are transmitted therethrough to the wheels are consequently very much weakened. The extent of the weakening depends on the length of the path through the material of the side walls. That path will be at its longest if the carcass plies are wholly eliminated but such total elimination is not essential. A satisfactory structure is obtained with a carcass ply which extends from the vicinity of the tread to about midway between an edge of tread and the bead. Where such a carcass ply is provided, it can extend continuously beneath the tread or it can be discontinuous and merely overlap the tread in the vicinity of the lateral edges of the tread reinforcing plies.

A second advantage of tires embodying the invention is that they are less subject to wear of the tread. It has been discovered that tread wear is a function of the uniformity of distribution of lateral forces acting on the tread where it is in contact with the road surface. It has been discovered also that the elimination or interruption of the carcass plies enhances the uniformity of distribution of stresses and hence leads to a reduction in tread wear. The improvement in this respect is most marked where the tread zone of the tire is made very resistant to deflection or distortion, for example, as described and claimed in U.S. Patent No. 2,493,614.

A further advantage is the saving of carcass ply material and, in the case of total elimination of the carcass plies, simplification in manufacture. In the absence of carcass plies, it becomes possible to manufacture the side walls by extrusion in the manner in which inner tubes are made. Such a method has the advantages of being rapid and automatic.

Weakening of the tire by omission or interruption of the carcass plies can be compensated for, in accordance with the present invention, by using rubber or other material of greater rigidity and higher modulus of elasticity in those portions of the side walls which are devoid of carcass plies.

For a better understanding of the present invention reference may be had to the accompanying drawings in which:

FIGURE 1 is a view in cross-section through a casing completely devoid of carcass plies;

FIGURE 2 is a view in cross-section through a casing having a carcass ply which extends across the tread portion of the tire but not as far as the beads;

FIGURE 3 and 4 are views in cross-sections through a casing having two discontinuous carcass ply-portions;

Figure 5:
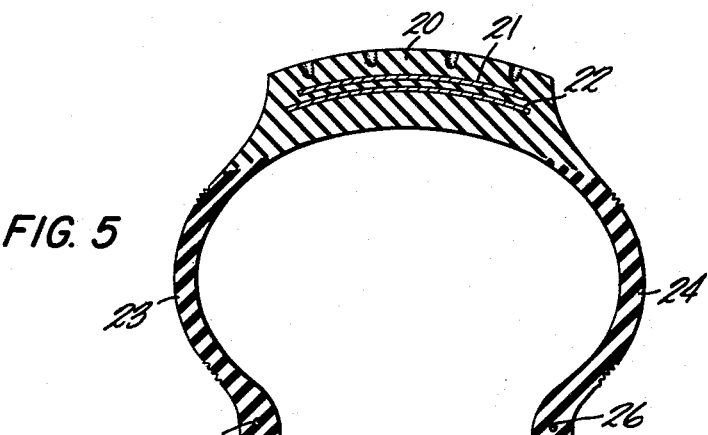
FIGURE 5 is a view in cross section of a casing which is completely devoid of carcass plies and which has two crossed reinforcing plies coextensive with the tread portion.

In all the figures, the portions of the walls which are devoid of carcass plies are shown heavily cross hatched. In all cases too, the casing has a tread reinforcement and bead wires.

FIGURE 1 illustrates a tire casing T having the usual bead edges 2 and 3 at the edges of the sidewalls 4 and 5 and a tread portion 6 carrying a running tread band 7. Three plies 8, 8a and 8b of a fabric are disposed below the surface of the tread band and serve to reinforce it and retain it against distortion as described more particularly in my U.S. Patent No. 2,493,614. As shown in this patent, the cables in the tread reinforcing layers are metallic or have similar properties. The cables in each layer are parallel and the cables in the three layers extend in different directions to provide a triangular relation between them. The tire disclosed in FIGURE 1 differs from conventional tires in that the side walls 4 and 5 are completely free from fabric plies. Inasmuch as the omission of fabric plies from the side walls would weaken a tire undesirably, the new tires embodying the present invention are modified to render them as strong as conventional tires. In accordance with the present invention, the ply-free parts of the tire casing T are strengthened by forming them of a rubber having a relatively high modulus of elasticity. Whereas conventional tires are formed of rubber or synthetic rubber having a modulus of elasticity not exceeding about 250 grams per mm.$^2$, in accordance with the present invention the elastomeric material (rubber, synthetic rubber, plastic or the like) used in the parts which are devoid of fabric plies has a modulus of elasticity of at least 800 grams per square millimeter at 100% elongation.

Modulus of elasticity of rubber and other elastomers is expressed by the equation, $$K = P/S$$

wherein K is the modulus, S is the cross-section of the test piece and P is the force necessary to double the length of the test piece (100% elongation). With materials of very high modulus, it is not practical to elongate or stretch the test piece 100%. Such materials are elongated only 25% or some other convenient amount, and the modulus is then calculated from the results obtained to determine the force required to stretch the test piece 100%. In the metric system, and as used herein, modulus of elasticity is expressed in grams per mm.$^2$. Inasmuch as rubber having a modulus of 800 varies non-linearly in its elongation under increasing stress, the 800 modulus referred to above is arrived at by measuring the force required to stretch a test block of the rubber 25% (in this case 200 grams per mm.$^2$) and multiplying the force by four.

In the U.S. system, modulus of elasticity is expressed in pounds per square inch at 100% elongation. 800 grams per mm.$^2$ corresponds to approximately 1140 pounds per square inch in the U.S. system.

Modulus of elasticity can also be expressed in dynes per cm.$^2$ at 100% elongation. A value of 800 grams per mm.$^2$ corresponds to about 78,480,000 dynes per cm.$^2$. Inasmuch as values expressed in dynes per cm.$^2$ are very high numerically and are not very convenient for indicating modulus of elasticity, they seldom are used except for expressing theoretical modulus of elasticity.

Rubber of even higher modulus of elasticity can be used in the ply-free portions of the sidewall, providing the rubber is not brittle and does not render the sidewalls brittle. The practical upper limit of modulus of rubber suitable for the sidewalls having the required sidewall strength, long operating life and riding comfort is about 8000 grams per mm.$^2$ (measured at 5% elongation and calculated to 100% elongation [force in grams per mm.$^2$ at 5% elongation $\times$ 20]).

A typical rubber composition for the sidewalls of the new tire is as follows:

| | Parts |
|---|---|
| Rubber | 100 |
| Carbon black | 60 |
| Heat hardening resin | 20 |
| ZnO | 10 |
| Anti-oxidant | 2 |
| Fatty acid | 3 |
| Santocure | 3 |
| DPG (diphenyl guanidine) | 1 |
| Sulfur | 4 |

A suitable heat hardening resin is a phenolic resin.

Santocure is N-cyclohexyl-2-benzothiazyl-sulfonamide, an accelerator manufactured by Monsanto Chemical Co.

A suitable fatty acid is stearic acid.

A suitable antioxidant for the rubber composition is sold by Naugatuck Chemical Co., a corporation of Connecticut, under the trademark "Flexamine."

The exemplary rubber composition, when vulcanized, has a modulus of elasticity of approximately 2,500 to 3,000 grams per mm.$^2$ (measured at 25% elongation and calculated to 100% elongation).

The casing T' disclosed in FIGURE 2 differs from the casing T in that it has a tread reinforcement formed of two fabric plies 9a and 9b which is supplemented by a carcass ply of fabric 10 which extends across the tread portion to about the mid-portion of the side walls 11 and 12.

In FIGURE 3, the tread reinforcement of the casing T" is formed of two plies 13 and 14 and a discontinuous carcass ply is provided, the two parts 15 and 16 of which extend from about the midpoints in the side walls to a short distance beyond the outer edges of the tread reinforcement. The plies 13 and 14 may be embedded in rubber having a modulus of elasticity of at least 350 grams per mm.$^2$.

The casing shown in FIGURE 4 has a tread reinforcement and a carcass ply 17 the same as in FIGURE 3 but the ends 17a and 17b of the carcass ply 17 are turned over so as to provide a firm anchorage in the material of the parts of the wall in which there is no carcass ply and thus ensure a good joint.

The invention extends to all arrangements in which there is no carcass ply in the side walls in the vicinity of the beads. For example, the tread reinforcement shown in FIG. 1 could be associated with side wall structures as shown in FIGS. 2, 3 or 4, and conversely the tread portion reinforcement shown in FIGS. 2, 3 and 4 could be associated with side walls completely free from fabric plies as shown in FIG. 1. Moreover, the anchorage of the continuous carcass ply 12 of FIG. 2 may be parts of the wall in which there is no carcass ply and as shown in FIG. 4.

FIGURES 5 through 10 illustrate the permutations referred to above. In each case the plies in and substantially coextensive with the tread portions of the tires to be described in connection with FIGURES 5–10 may comprise separate layers of wires or cables made of metal or a similar material. The wires in each layer may be parallel and be embedded in a rubber having a modulus of elasticity of at least 350 grams per square millimeter at 100% elongation, and the wires in different layers may extend in different directions. In each case also, portions of the sidewalls in the vicinity of the beads are devoid of reinforcing plies, and such portions are formed of an elastomeric material such as rubber having a modulus of elasticity of at least 800 grams per square millimeter at 100% elongation.

The tire casing shown in FIGURE 5 has a tread portion 20 provided with two tread-reinforcing plies 21 and 22 and sidewalls 23 and 24 extending between the tread portion 20 and beads 25 and 26, respectively. The sidewalls 23 and 24 are completely devoid of reinforcing plies.

Figure 6:
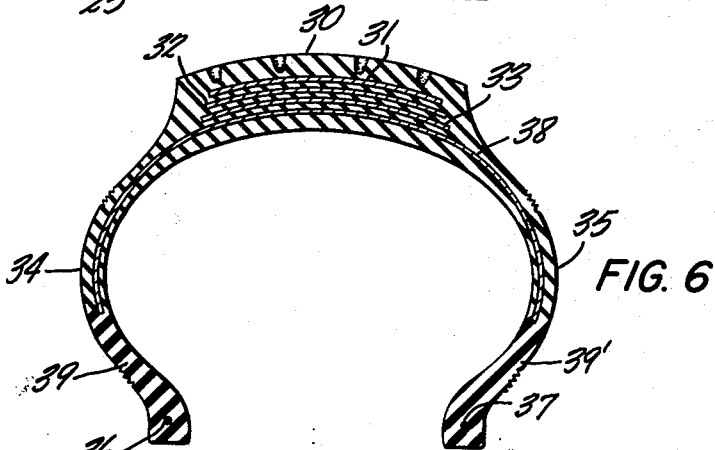
FIGURES 6 through 10 are views in cross section of additional embodiments of a casing constructed in accordance with the invention.

FIGURE 6 shows a tire casing having a tread portion 30 provided with three tread-reinforcing plies 31, 32 and 33 and sidewalls 34 and 35 extending between the tread portion 30 and beads 36 and 37, respectively. The sidewalls 34 and 35 have reinforcing fabric-ply means 38 extending from about the midpoint of one sidewall across the tread portion, in which it is embedded, and to about the midpoint of the opposite sidewall. Portions 39 and 39' of the sidewalls 34 and 35, respectively, are devoid of reinforcing plies.

Figure 7:
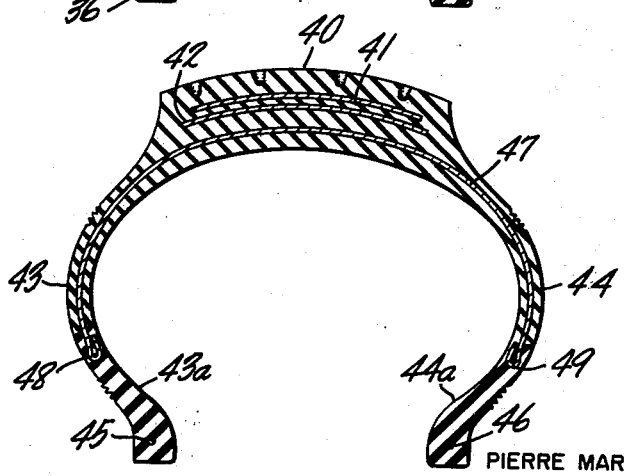

The tire casing shown in FIGURE 7 has a tread portion 40 provided with two tread-reinforcing plies 41 and 42 and sidewalls 43 and 44 extending between the tread portion 40 and the beads 45 and 46, respectively. The tire casing is further provided with a reinforcing fabric-ply means 47 embedded in and extending across the tread portion 40 and into each sidewall 43 and 44 to about the midpoint thereof. Portions 43a and 44a of the sidewalls 43 and 44, respectively, are devoid of reinforcing plies. The ends 48 and 49 of the reinforcing fabric-ply means 47 are turned over to assure a good joint with the material of the sidewalls 43 and 44, respectively.

Figure 8:
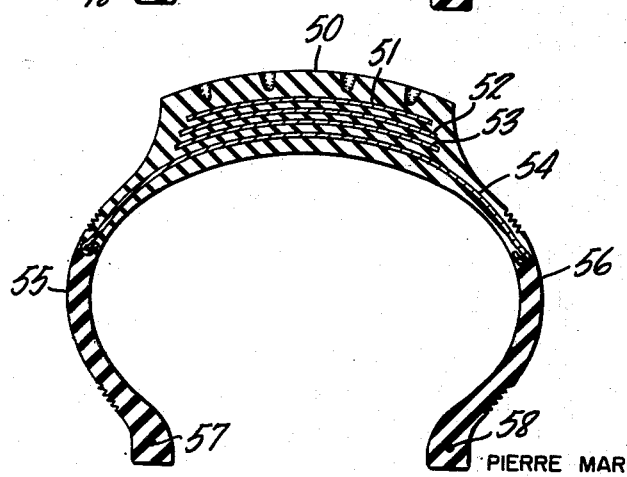

The tire casing shown in FIGURE 8 is identical to that shown in FIGURE 7 except that the tread portion 50 of the tire casing of FIGURE 8 contains not merely two tread-reinforcing plies 51 and 52 but also a third reinforcing ply 53 substantially coextensive with the tread portion 50, and reinforcing fabric-ply means 54 are provided which extend into sidewalls 55 and 56 less than half the distance between the tread portion 50 and beads 57 and 58.

Figure 9:
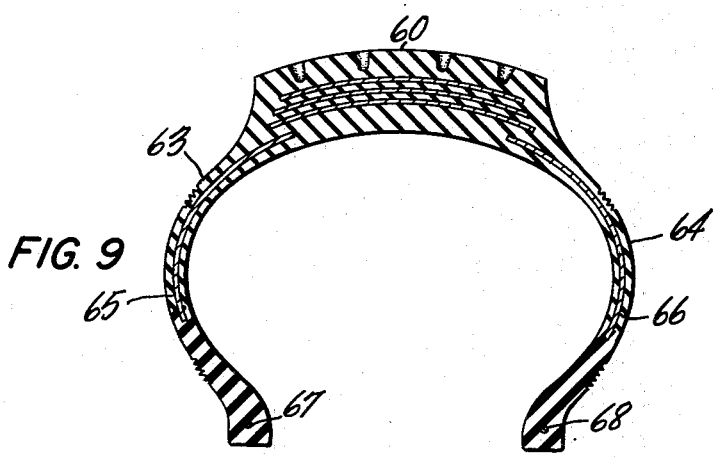

The pneumatic tire casing shown in FIGURE 9 is identical to that shown in FIGURE 8 except that the tire casing of FIGURE 9 has in its sidewalls 63 and 64 two reinforcing plies of fabric 65 and 66 extending from about the midpoint of the sidewalls 63 and 64, respectively, to slightly beyond the nearer edges of the tread-reinforcing plies, and the ends of the plies 65 and 66 nearer to beads 67 and 68 are not turned over.

Figure 10:
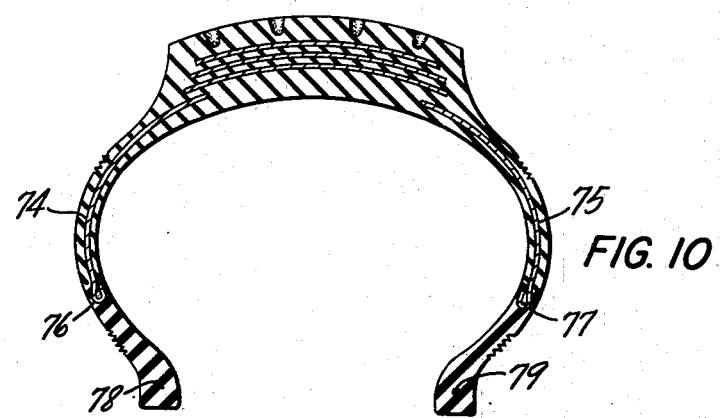

The pneumatic tire casing illustrated in FIGURE 10 is identical to that shown in FIGURE 9 except that the fabric-ply reinforcing means 74 and 75 have their ends 76 and 77 nearer to the beads 78 and 79 turned over to assure a good joint with the material of the sidewalls.

As indicated above, tire casings embodying the present invention have improved riding comfort, long operating life and are easily manufactured. Moreover, their roadability is better than that of prior tires, evidently for the reason that the increased resistance to deflection of the high modulus material in the side walls reduces lateral deflection or "rolling under" of the casing when going around curves.

The fabric of the plies can be formed of parallel metal cords, wires or cables or of textile or other threads such as nylon, rayon, plastic threads generally, spun glass and so on. The side walls, whether reinforced or not, can be of natural or synthetic rubber or wholly or partly of suitable synthetic plastics.

The bead wires can be of conventional construction. It is, however, advantageous to wrap around the bead wires a narrow band containing metallic cords or cables or non-metallic cords or fabric extending a short distance into the side walls to tie the walls strongly to the beads.

It is also possible to provide two tread reinforcing plies formed of metal cords or the like and a narrow carcass ply as shown in FIG. 2 but also formed of metal cords or the like to obtain the desired triangular relation of the reinforcing cables or cords in the tread zone of the tire.

From the preceding description it will be apparent that the embodiments of the invention are susceptible to considerable modification and accordingly, the forms of tires disclosed herein should be considered as illustrative.

I claim:

1. A pneumatic tire casing comprising sidewalls, a tread portion joined to and between the sidewalls, a running tread band on said tread portion and beads at the free edges of said sidewalls, at least two tread reinforcing plies substantially coextensive with said tread band, reinforcing fabric-ply means extending from about the midpoint of each sidewall to a position at least slightly beyond the nearer edge of said tread reinforcing plies, said sidewalls otherwise being free from reinforcing plies at least in the vicinity of said beads, the portions of the sidewalls which are free from reinforcing plies being formed of elastomeric material having a modulus of elasticity of at least 800 grams per square millimeter at 100% elongation.

2. The tire casing set forth in claim 1 in which said reinforcing fabric ply means comprises two reinforcing plies each extending from about the midportion of a sidewall to slightly beyond the nearer edge of the tread reinforcing ply.

3. The tire casing according to claim 2 in which the ends of said two reinforcing plies nearer to said beads are turned over to insure a good joint with the material of the portions of the side walls which are not reinforced.

4. The pneumatic tire casing set forth in claim 1 in which said reinforcing fabric-ply means comprises a reinforcing ply of fabric embedded in and extending across the tread portion and extending into each sidewall less than half the distance between the tread portion and the bead at the free edge of said sidewall.

5. The tire casing according to claim 4 in which the ends of said reinforcing ply are turned over to insure a good joint with the material of the portions of the side walls which are not reinforced.

6. The tire casing set forth in claim 1 in which the edges of said fabric plies nearer to said beads are folded over to secure them more firmly in said sidewalls.

7. The tire casing set forth in claim 1 in which said two tread-reinforcing plies comprise two separate superimposed layers of metallic wires coextensive with said tread band, the wires in each layer being substantially parallel and the wires of different layers extending in different directions and being embedded in a rubber having a modulus of elasticity of at least 350 grams per square millimeter at 100% elongation and in which said reinforcing fabric-ply means comprises two sidewall reinforcing plies each extending from about the midpoint of a sidewall to slightly beyond the nearer edge of the tread reinforcing layers.

8. The tire casing according to claim 7 in which the ends of the sidewalls reinforcing plies nearer to said beads are turned over to insure a good joint with the material of the portions of the sidewalls which are not reinforced.

9. The pneumatic tire casing set forth in claim 1 in which said two tread-reinforcing plies comprise two separate superimposed layers of metallic wires substantially coextensive with said tread band, the wires in each layer being substantially parallel and the wires of different layers extending in different directions and being embedded in a rubber having a modulus of elasticity of at least 350 grams per square millimeter at 100% elongation, and in which said reinforcing fabric-ply means comprises a sidewall reinforcing ply of fabric embedded in and extending across the tread portion and extending into each sidewall less than half the distance between the tread portion and the bead at the free edge of the sidewall.

10. The tire casing according to claim 9 in which the ends of said reinforcing ply are turned over to insure a good joint with the material of the portions of the sidewalls which are not reinforced.

11. The tire casing set forth in claim 1 in which said two tread-reinforcing plies comprise two separate superimposed layers of metallic wires coextensive with said tread band and further comprising a third layer of metallic wires coextensive with said tread band, the wires of each of said three layers being substantially parallel and the wires in different ones of said three layers extending in different directions and in which said reinforcing fabric-ply means comprises two sidewall reinforcing plies each extending from about the midpoint of a sidewall to slightly beyond the nearer edge of the tread reinforcing layers.

12. The tire casing according to claim 11 in which the ends of the sidewalls reinforcing plies nearer to said bead are turned over to insure a good joint with the material of the portions of the sidewalls which are not reinforced.

13. The pneumatic tire casing set forth in claim 1 in which said two tread-reinforcing plies comprise two separate superimposed layers of metallic wires substantially coextensive with said tread band and further comprising a third separate superimposed layer of metallic wires substantially coextensive with said tread band, the wires in each layer being substantially parallel and the wires in different ones of the three layers extending in different directions, and in which said reinforcing fabric-ply means comprises a sidewall reinforcing ply of fabric embedded in and extending across the tread portion and extending into each sidewall less than half the distance between the tread portion and the bead at the free edge of the sidewall.

14. The tire casing according to claim 13 in which the ends of said reinforcing ply are turned over to insure a good joint with the material of the portions of the sidewalls which are not reinforced.

15. The pneumatic tire casing set forth in claim 1 in which said two tread-reinforcing plies comprise two separate superimposed layers of metallic wires substantially coextensive with said tread band and further comprising a third separate superimposed layer of metallic wires substantially coextensive with said tread band, the wires in each layer being substantially parallel and the wires in different ones of said three layers extending in different directions, and in which said reinforcing fabric-ply means comprise two sidewalls reinforcing plies of fabric in and extending from about the midpoint of each sidewall to a position slightly beyond the nearer edges of said layers of metallic wires.

16. The tire casing according to claim 15 in which the ends of the sidewalls reinforcing plies nearer to said beads are turned over to insure a good joint with the material of the portions of the sidewalls which are not reinforced.

References Cited by the Examiner

UNITED STATES PATENTS

| | | | |
|---|---|---|---|
| 1,827,668 | 10/31 | Musselman | 152—330 |
| 2,493,614 | 1/50 | Bourdon | 152—356 |
| 2,721,185 | 10/55 | Schulze et al. | |
| 2,757,701 | 8/56 | Henson | 152—362 X |
| 2,803,620 | 8/57 | Mills | 260—43 |
| 2,811,998 | 11/57 | Crepin et al. | 152—354 |

FOREIGN PATENTS

| | | |
|---|---|---|
| 522,318 | 3/21 | France. |
| 736,231 | 9/32 | France. |
| 677,166 | 8/52 | Great Britain. |

ARTHUR L. LA POINT, *Primary Examiner.*

JACOB A. MANIAN, RICHARD A. DOUGLAS,
*Examiners.*